May 7, 1963 G. B. STONE 3,088,637
BULK FEED BIN
Filed Dec. 22, 1960 3 Sheets-Sheet 1

Guthrie B. Stone
INVENTOR.

May 7, 1963
G. B. STONE
3,088,637
BULK FEED BIN
Filed Dec. 22, 1960
3 Sheets-Sheet 2
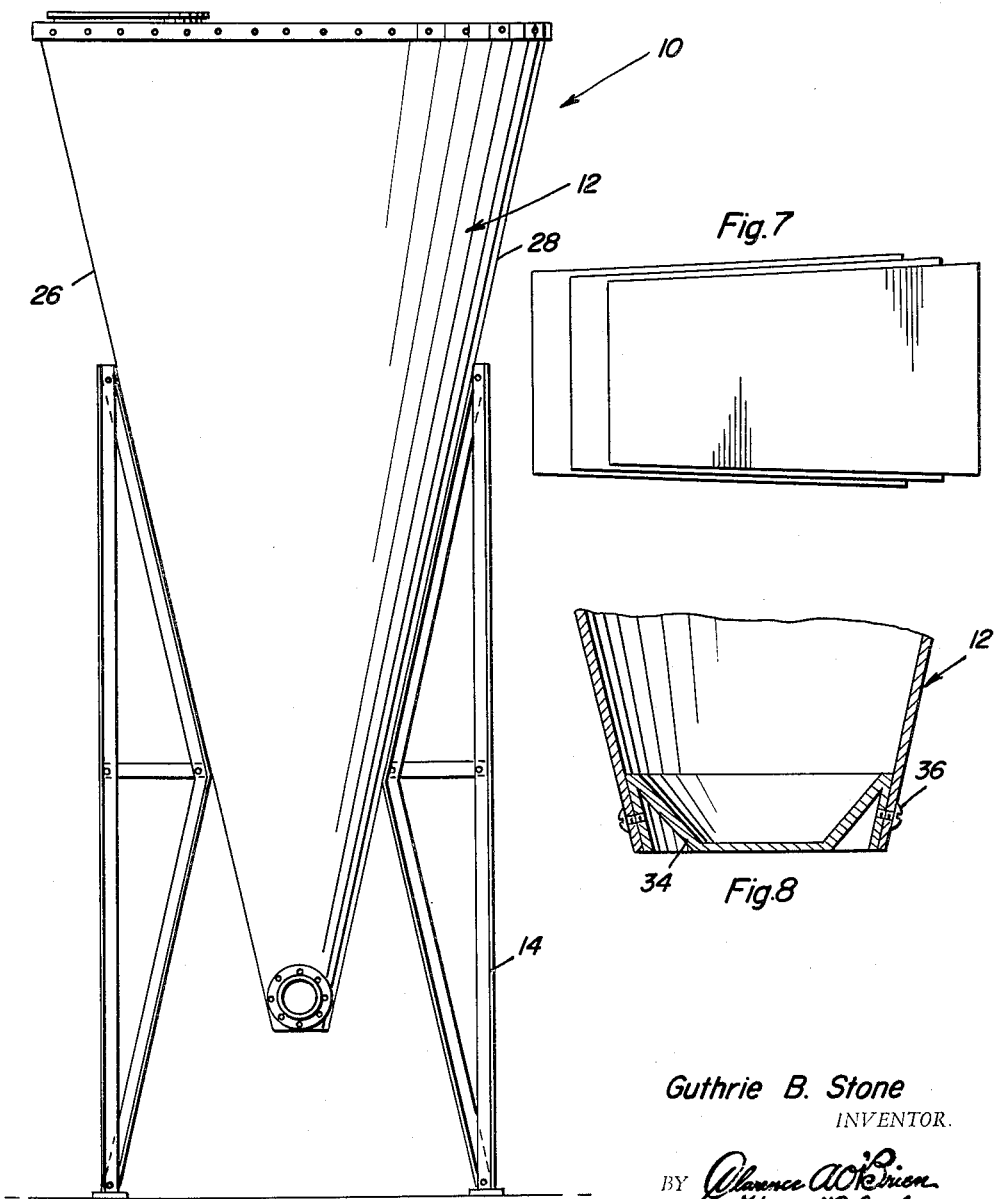
Guthrie B. Stone
INVENTOR.

May 7, 1963 — G. B. STONE — 3,088,637
BULK FEED BIN
Filed Dec. 22, 1960 — 3 Sheets-Sheet 3
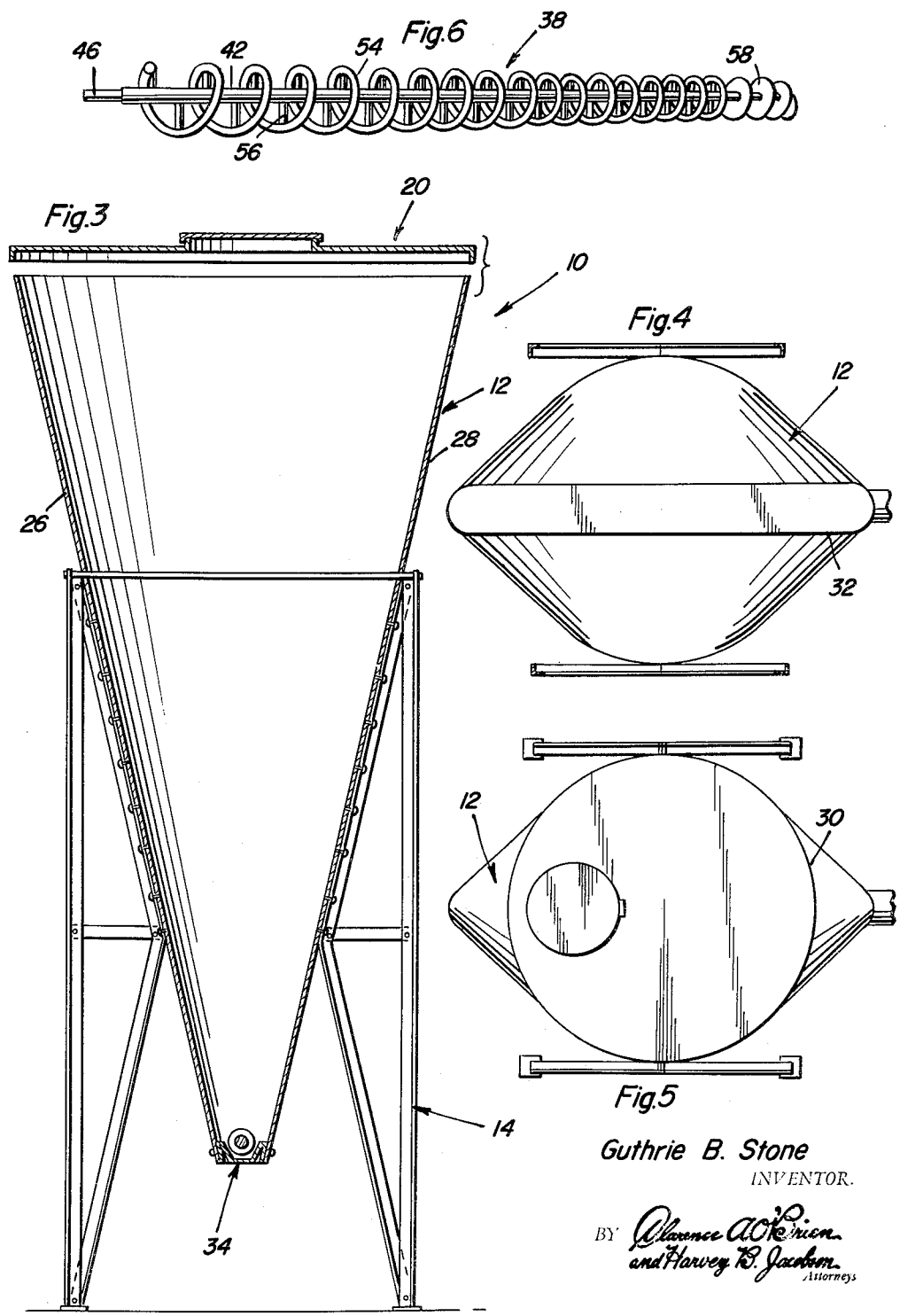
Guthrie B. Stone
INVENTOR.

United States Patent Office 3,088,637
Patented May 7, 1963

3,088,637
BULK FEED BIN
Guthrie B. Stone, % Stone Conveyor Co., Inc.,
Honeoye, N.Y.
Filed Dec. 22, 1960, Ser. No. 77,639
4 Claims. (Cl. 222—413)

This invention relates to storage and dispensing mechanism for hard to handle materials having poor flow characteristics.

The apparatus of this invention is especially useful for storing bulk feed such as cattle feed with 10% molasses content and dispensing it when desired although the apparatus is not necessarily restricted thereto. Bulk feed of the aforementioned type is very difficult to handle and has been handled by commercially available storage bins in an unsatisfactory manner. Such storage bins now available are generally made of corrugated galvanized metal and have a conical shape with a small opening at the bottom thereof which often requires continual hammering to make the material drop out of the opening when it is desired to dispense material from the bin. Furthermore, such bins are made in many pieces requiring complicated assembly and expensive manufactering procedures. It is therefore a primary object of this invention to not only more economically manufacture bulk feed storage bins but to provide bins which will facilitate handling of the poorly flowing material and also be readily adaptable for use with an auger feed mechanism for dispensing the material therefrom.

It is therefore a primary object of this invention to provide a bulk feed storage and dispensing apparatus which features a bin which is formed from sheet material into a truncated conical configuration so that the bins may be more economically manufactured and may also be nested for more economic transport purposes. The bins upon arriving at their installation location are then deformed into their final configuration by deforming the bottom edge thereof into an elongated slot shape so that the sides of the bin will be tapered to diverge in a downward directioin facilitating movement of the poorly flowing material.

A still further object of this invention is to provide an auger feed mechanism in connection with the aforementioned bin construction which features a portion having a spiral rod construction covering the majority of the bottom length of the bin and having the usual solid auger screw portion extending a short distance into the bin and extending outwardly therefrom within a trough to finally move the bulk feed toward the delivery end of the trough. As a result thereof, the resistance ordinarily offered to a conventional type auger feed mechanism preventing rotation thereof is avoided by use of the novel auger feed mechanism hereinabove described.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side elevational view of the apparatus illustrated in FIGURE 1.

FIGURE 3 is a sectional view taken through a plane indicated by section line 3—3 of FIGURE 1.

FIGURE 4 is a bottom view of the bulk feed bin of this invention.

FIGURE 5 is a top plan view of the bulk feed bin apparatus of this invention.

FIGURE 6 is a perspective view of the novel auger feed conveyor mechanism of this invention.

FIGURE 7 is a schematic view of a plurality of nested bins prior to installational deformation thereof.

FIGURE 8 is an enlarged sectional view illustrating the trough connected to the bottom end of the bin.

Figure 1:
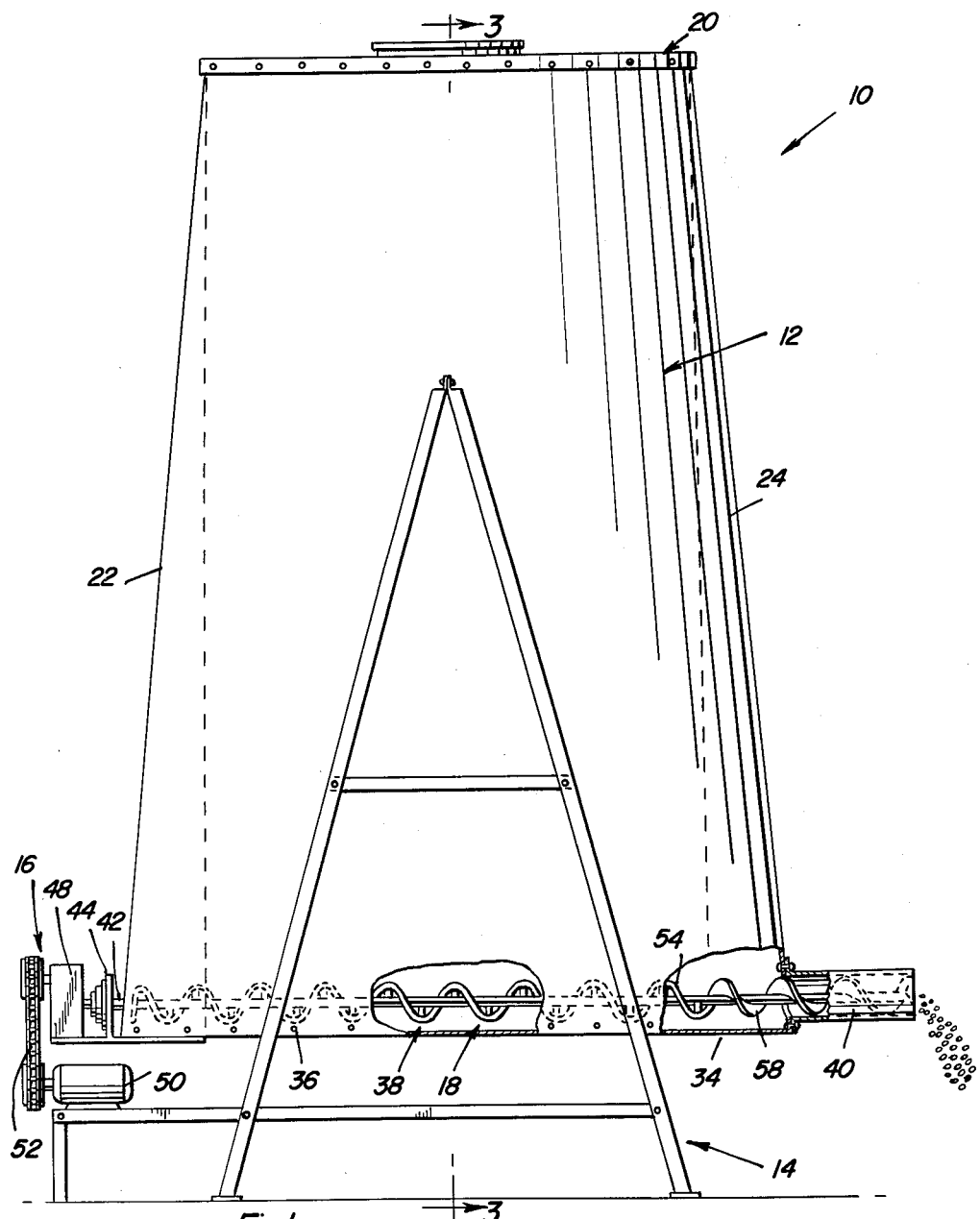
FIGURE 1 is a front elevational view with parts broken away of the apparatus of this invention.

Referring now to the drawings in detail, it will be observed from FIGURES 1, 2 and 3 that the bulk feed storage and dispensing apparatus of this invention is generally indicated by reference numeral 10. It will therefore be observed that the apparatus includes a bin generally indicated by reference numeral 12 which is mounted in spaced relation about the ground by a frame assembly generally indicated by reference numeral 14. It will also be observed from FIGURE 1 that mounted upon the frame assembly 14 adjacent the bottom thereof is a drive mechanism generally indicated by reference numeral 16 which is drivingly connected to an auger feed mechanism generally indicated by reference numeral 18 disposed adjacent the bottom of the bin 12. Also, mounted on the top of the bin 12 is a cover member generally indicated by reference numeral 20 through which the bulk feed is admitted into the bin 12. The bulk feed may then be dispensed from one side of the bin by means of the auger feed mechanism 18 driven by the drive mechanism 16 in order to dispense the bulk feed from the bin as more clearly seen in FIGURE 1.

It will be observed that the bin 12 is formed from a single continuous and smoothly curved sheet of material preferably steel. In FIGURES 1, 2 and 3 the bin 12 is illustrated in its final form into which it is deformed at its installational location. In FIGURE 1 therefore it will be noted that in one plane the bin has tapering sides 22 and 24 which diverge in a downward direction to facilitate movement of the bulk feed downwardly therethrough. In a plane perpendicular to the plane through which FIGURE 1 is viewed, the bin has tapering sides 26 and 28 which converge in a downward direction as seen in FIGURES 2 and 3. The foregoing configuration of the bin 12 arises from the fact that the bin forms at the top thereof a circular edge 30 as seen in FIGURE 5 while at the bottom of the bin an elongated slot 32 is defined having parallel sides interconnected at the opposite ends thereof by curved portions. The foregoing described final configuraiton of the bin 12 results from deforming the bottom end of a truncated conical configuration having circular edges at both ends thereof. Although substantially the same final shape of the bin 12 may be arrived at by deforming a cylindrical configuration, a truncated conical configuration is utilized so that the bins before being deformed into their final form may be conveniently nested as illustrated in FIGURE 7 for more economical transport purposes inasmuch as the nested truncated cone occupies less space than would be possible with equally sized cylindrical members Also, by use of the truncated cone configuration, easier removal of the formed truncated cone is possible from the forming apparatus which forms the truncated cone from a flat sheet of material. It will therefore be apparent to any one skilled in the art, that when the bin is deformed into its final configuration at the installational location, not only does the resulting downwardly diverging tapering sides 22 and 24 facilitate movement of the poorly flowing bulk feed material but such configuration also accommodates the elongated auger mechanism 18 by means of which the bulk feed is dispensed from the bottom end of the bin 12.

Referring therefore to FIGURES 1, 3, 6 and 8 it will be observed that the lower elongated slotted end of the bin 12 is closed by means of a trough generally indicated by reference numeral 34. The trough is connected along the parallel sides of the lower edge 32 of the bin by means of a plurality of fasteners 36. Rotatably mounted within the trough is the special auger feed screw device generally indicated by reference numeral 38. It will also be observed that the auger screw device 38 extends outwardly beyond the side 24 of the bin 12 within a delivery trough portion 40 as more clearly seen in FIGURE 1.

The auger screw device 38 includes a drive shaft 42 which is rotatably mounted within the trough 34 and is also rotatably mounted by a journal bracket member 44. The drive end portion 46 of the shaft 42 is drivingly connected to the drive mechanism 16 which includes a gear reducer 48 drivingly connected to a drive motor 50 by means of the endless chain belt drive 52. Referring now to FIGURE 6 in particular it will be observed that the auger feed screw device 38 also includes a spiral rod portion constructed from a spirally arranged rod member 54 which is connected to the shaft 42 by a plurality of axially spaced connector members 56. A smaller portion of the auger feed screw device 38 is composed of a helical solid screw portion 58. With regard to the spiral rod portion, it will be observed that the axial spacing of the spiral rod reduces toward the delivery end of the screw device with the delivery end portion itself being constituted by the solid screw portion 58. Referring now to FIGURE 1, it will also be observed that the solid screw portion 58 extends a short distance into the bin with the remainder portion thereof being disposed within the delivery portion 40 of the trough. Most of the bottom of the bin 12 however, is occupied by the spiral rod portion 54 of the screw device 38. From the foregoing description of the auger screw device 38, it will be appreciated that in view of the rod formation of the screw occupying most of the bottom of the bin, the screw device will encounter less resistance from the bulk feed which ordinarily makes operation of the conventional type auger feed mechanism very difficult. The bulk feed is accordingly gently urged toward the delivery end of the auger feed mechanism 18 by the spiral rod 56 and when the feed approaches the delivery end it is more positively moved into the delivery portion 40 of the trough by the solid screw portion 58 of the auger feed mechanism 18.

From the foregoing description of the novel apparatus of this invention, it will be appreciated that a bulk feed bin is provided which not only may be manufactured with an unexpected degree of ease but may also be conveniently and more economically transported and installed by deforming the bin into its final shape whereby the elongated feed mechanism at the bottom thereof is conveniently accommodated and movement through the bin is facilitated by the resulting shape thereof. Also, the novel auger feed mechanism is so arranged as to operate effectively and in a more reliable manner than was heretofore possible with previous apparatus.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bin for a bulk feed apparatus comprising, a single continuous sheet of smoothly curved material having an upper edge and a lower edge to define a smoothly curved surface therebetween facilitating movement of fluent material for dispensing purposes, one of said edges having a perimetric length slightly larger than that of the other edge for receiving said fluent material therewithin, said upper edge being of circular configuration and said lower edge defining an elongated slot with straight parallel sides interconnected by curved portions at opposite ends thereof and means mounted in the elongated slot for movement of the fluent material therealong toward a dispensing end of the elongated slot.

2. A bulk feed apparatus comprising a bin having an open top, a bottom with a perimeter less than that of the top and tapering sides diverging downwardly, trough means closing said bin at said bottom and extending beyond one of said sides of the bin adjacent the bottom thereof to a delivery end, an auger feed mechanism rotatably mounted in the trough means for moving bulk feed through the trough means to the delivery end thereof, drive means operatively connected to the auger mechanism and frame means for mounting the bin and drive means in operatively spaced relation to each other, said auger feed mechanism comprising a spiral rod portion disposed within the bin and solid screw portion partially disposed within the bin and extending beyond said one side thereof within the trough means toward the delivery end thereof, said bin comprising a single continuous sheet of smoothly curved material having an upper edge and a lower edge defining said open top and bottom respectively, said upper edge being of circular configuration and said lower edge defining an elongated slot with straight parallel sides interconnected by curved portions at opposite ends thereof.

3. A bulk feed apparatus comprising, a bin having an open top, a bottom with a perimeter less than that of the top and tapering sides diverging downwardly, trough means closing said bin at said bottom and extending beyond one of said sides of the bin adjacent the bottom thereof to a delivery end, an auger feed mechanism rotatably mounted in the trough means for moving bulk feed through the trough means to the delivery end thereof, drive means operatively connected to the auger mechanism and frame means for mounting the bin and drive means in operatively spaced relation to each other, said bin comprising a single continuous sheet of smoothly curved material having an upper edge and a lower edge defining said open top and bottom respectively, said upper edge being of circular configuration and said lower edge defining an elongated slot with straight parallel sides interconnected by curved portions at opposite ends thereof.

4. A dispensing hopper construction having an inlet and outlet passage means comprising, a continuous curved surface member having parallel spaced edge portions of unequal perimetrical length, one of said edge portions defining the inlet, the outlet passage means being connected to the other of said edge portions, tapering wall portions interconnecting said spaced edge portions, one of said edge portions being in circular in shape, the other of said edge portions being dimensionally elongated in one direction, one of said tapering wall portions tapering in one direction, the other of the wall portions tapering in a reverse direction to said one wall portion.

References Cited in the file of this patent

UNITED STATES PATENTS

| | | |
|---|---|---|
| 857,736 | Hodgson | June 26, 1907 |
| 992,421 | Hardie | May 16, 1911 |
| 1,258,668 | Gauntt | Mar. 12, 1918 |
| 1,467,951 | Rosenberger | Sept. 11, 1923 |
| 2,031,326 | Miller | Feb. 18, 1936 |
| 2,583,365 | Eddy | Jan. 22, 1952 |
| 2,601,608 | Hansen | June 24, 1952 |
| 2,800,252 | Wahl | July 23, 1957 |

FOREIGN PATENTS

| | | |
|---|---|---|
| 90,257 | Netherlands | Jan. 16, 1959 |
| 651,985 | Germany | Oct. 22, 1937 |